April 6, 1954
G. W. FEIL, JR
2,674,330
PROPELLER SHAFT SUPPORT HAVING YIELDABLE
CONNECTION WITH CHASSIS FRAME
Filed April 12, 1952
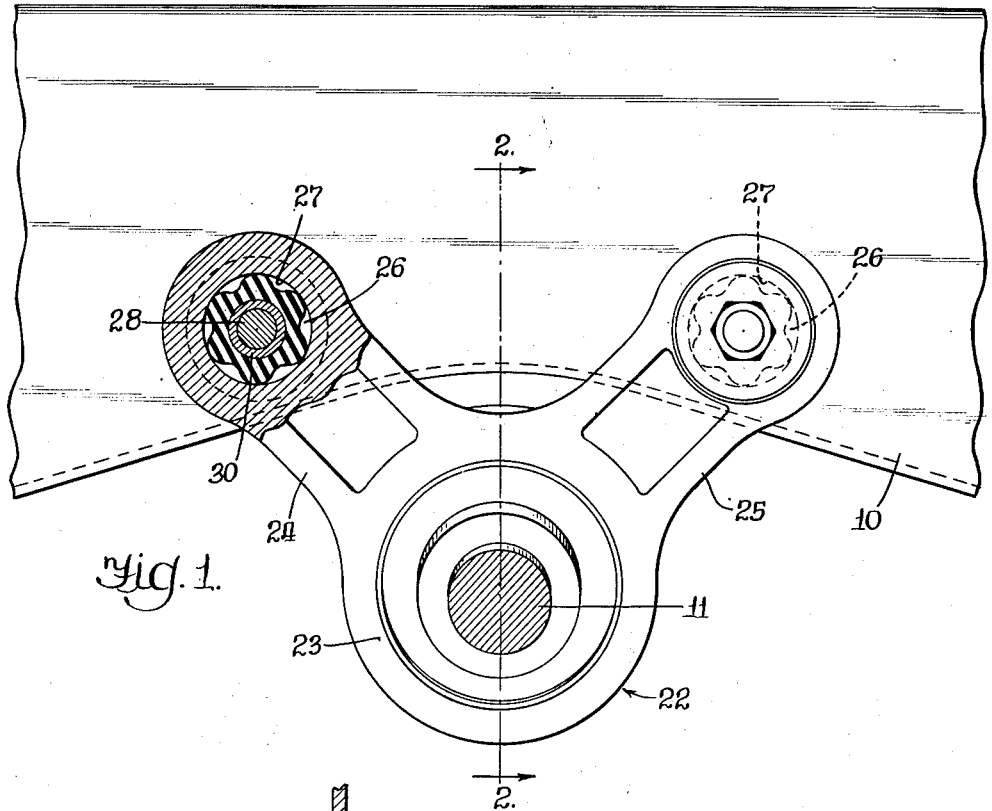
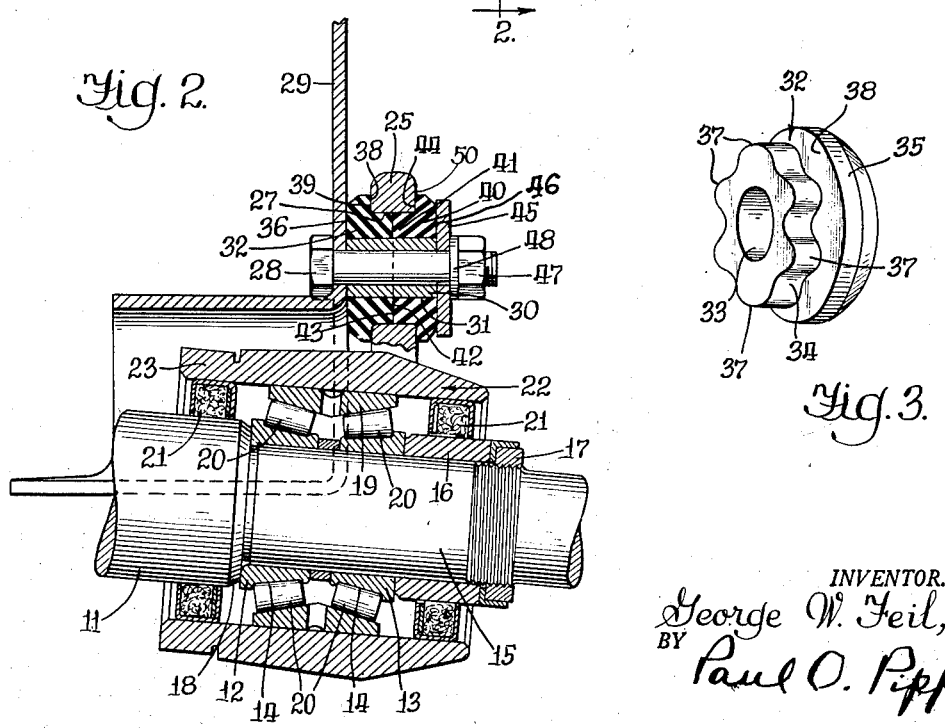
INVENTOR.
George W. Feil, Jr.
BY Paul O. Pippel
Atty.

Patented Apr. 6, 1954

2,674,330

UNITED STATES PATENT OFFICE 2,674,330

PROPELLER SHAFT SUPPORT HAVING YIELDABLE CONNECTION WITH CHASSIS FRAME

George W. Feil, Jr., Fort Wayne, Ind., assignor to International Harvester Company, a corporation of New Jersey Application April 12, 1952, Serial No. 282,070

2 Claims. (Cl. 180—70)

This invention relates to bearing mountings, and more particularly to a new and improved structure for supporting the propeller shaft of an automotive vehicle.

The present trend in motor vehicle construction and design has been toward longer propeller shafts, caused partly by an increase in the wheel base length and partly because the engine has been placed forwardly over the front axle in many vehicles. Inasmuch as the provision of a single, solid propeller shaft extending from the engine to the drive axle was found to be impractical because of the excessive whip developed by the shaft at high vehicle speeds, the propeller shaft in present-day motor vehicles generally comprises two or more shafts arranged end-to-end and connected by universal joints which necessitates one or more intermediate shaft supports. It is, therefore, the primary objective of the present invention to provide a new and improved propeller shaft center bearing mounting structure of simple and inexpensive construction for eliminating the transmission of objectionable vibration to the chassis frame from the propeller shaft.

A further object is to provide a shaft supporting member which is connected to a chassis frame member by means of flexible universal joints in order to compensate for slight misalignments of the sectional shafts forming the propeller shaft and to acoustically cushion or isolate the shaft vibration.

A still further object is the provision of a flexible universal joint for connecting the shaft supporting member to the frame member which includes a bushing of resilient material having a tubular section thereof provided with a plurality of spaced ridges to increase the flexibility of the joint.

Another object is the provision of a yieldable flexible joint for connecting the shaft supporting member to the chassis frame which includes a bushing of resilient material disposed so as to frictionally engage the supporting member and the frame member.

The foregoing and other important objects and desirable features inherent in and encompassed by the invention, together with many of the purposes and uses thereof, will become readily apparent from a reading of the ensuing description in conjunction with the annexed drawings, in which:

Figure 1 is an end elevational view, partially cut away, showing the propeller shaft supporting member attached to a chassis frame member;

Figure 2 is a sectional view taken substantially along line 2—2 of Figure 1; and Figure 3 is a perspective view of one of the resilient bushings illustrated in Figures 1 and 2.

Referring to the drawings, wherein like reference characters designate like elements throughout the various views, a chassis frame cross member 10 is partially shown. Disposed below and extending crosswise of the frame cross member 10 is a section of the vehicle propeller shaft 11. A pair of inner race rings 12, 13, having conical raceways 14 tapered inwardly, are clamped or otherwise secured to a reduced-diameter portion 15 of the shaft 11. Mounted on the portion 15 adjacent the race ring 13 is a spacer ring 16 which is forced to the left, as viewed in Figure 2, by means of a lock nut 17 threaded on the portion 15 to clamp the race rings 12, 13 against the shoulder 18 formed on the shaft 11. Interposed between the inner race rings 12 and 13 and a double cone outer race ring 19 are rolling elements 20 of conventional design. Suitable seals 21 are provided at each end of the bearing to retain lubricant therein.

The propeller shaft bearing support member 22 includes a tubular section 23 which encircles the inner and outer race rings 12, 13, and 19. The outer race ring 19 is slidably mounted within the tubular section 23. Extending upwardly and divergingly from the tubular section 23 are a pair of arms 24, 25 which are integrally formed with the tubular section. The arms 24, 25 terminate adjacent the chassis frame cross member 10 and the free ends thereof are provided with apertures 26. The cylindrical surfaces 27, which define the apertures 26, serve as bearing surfaces. A pair of bolts 28, carried by a vertical wall 29 of the frame cross member 10, extend through a respective aperture 26. Mounted on each bolt 28 is a sleeve 30 having an outer peripheral surface 31 radially spaced from a respective bearing surface 27.

Inasmuch as the yieldable flexible joints, connecting the arms 24 and 25 to the frame cross member 10 are identical, only one of the joints will be described in detail. A bushing 32 made of resilient material such as rubber or a rubber composition, shown detached from the support structure in Figure 3, having a cylindrical central bore 33, is received on the sleeve 30. The resilient bushing 32 includes a short tubular section 34 and an integrally-formed radially extending flange 35 at one end of the tubular section. The bushing 32, when assembled on the sleeve 30, is disposed so that one face 36 of the flange 35 abuts the vertical wall 29 and the tubular section 34 extends into the aperture 26 formed in the arm 24 or 25. The outer peripheral surface of the tubular section 34 is provided with a plurality of circumferentially spaced, radially projecting ridges 37 extending the full length of the tubular section, the purpose of which will be explained hereinafter, which frictionally engage the bearing surface 27 of the associated arm 24 or 25. The opposite face 38 of the flange 36 abuts the side 39 of the arm 24 or 25 facing the vertical wall 29 adjacent the aperture 26, as best shown in Figures 1 and 2. Hence, it will be obvious that a metal to metal contact between the vertical wall 29 and the sides 39 of the arms 24 and 25 is effectively prevented by the radial flange 36. A second bushing 40 having the same construction as the bushing 32, is positioned on the sleeve 30 and has its tubular section 41 extended into the aperture 26 from the opposite end of the aperture. The facing ends 42, 43 of the bushings 32, 40, respectively, abut one another within the aperture 26 and the flange face 44 of the second bushing 40 is disposed in an abutting relation with side 50 of the arm 24 or 25 opposite the side 39 thereof. A retainer washer 45 is received on the bolt 23 and is forced to the left, as viewed in Figure 2, into contact with the flange face 46 of the bushing 40 by means of a lock nut 47 and a lock washer 48 to clamp the arms 24 and 25 between the flange faces 38 and 44 and thus yieldably connect the support member 22 to the chassis frame member 10.

By virtue of the provision of the circumferentially spaced ridges 37 on the tubular sections 34 and 41 of the bushings 32 and 40, respectively, the flexibility of the joint is increased considerably since the ridges are capable of filling the void between successive ridges when a compressional load is applied thereto. It will be apparent that the resilient joints which connect the support member 22 to the frame member 10 not only dampen or absorb the shaft vibration but they also compensate for any slight misalignment of the shaft 11 with respect to the frame members because the bushings 32, 40 are readily deformable. Furthermore, by constructing the tubular sections 34 and 41 with ridges 37 thereon and a cylindrical bore, it is possible to obtain a joint having the combination of resilient characteristics and load carrying ability desired and needed with less volume of rubber than heretofore was necessary.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In an automotive vehicle, the combination including a propeller shaft and a chassis frame member extending crosswise of and above the shaft; a supporting member having an opening substantially concentric with said shaft being provided with bearing structure in which said shaft is journaled, said supporting member having a pair of integrally-formed arms extending divergingly, upwardly toward said frame member, each of said arms having a pair of vertical surfaces spaced from and parallel to each other and to a vertical wall of said frame member, the free end of each of said arms being provided with an aperture to form a cylindrical bearing surface; flexible universal joints connecting said arms to said frame member, each of said joints including a stud extending normally from the vertical wall of said frame member, a sleeve carried by said stud having its outer surface spaced from an associated bearing surface, a ring-like insulator of resilient material mounted on said sleeve having a channel-shaped recess formed on its outer peripheral surface midway between its ends to provide a first radial flange, a second radial flange spaced from said first flange, and an intermediate section disposed between said sleeve and said bearing surface and abutting said sleeve and having an axial length equal to the axial length of said bearing surface, said first flange being interposed between said vertical wall and one of said vertical surfaces and having an axial thickness substantially equal to the axial thickness of said second flange and substantially equal to one half of the axial length of said intermediate section, and said second flange being interposed between said other vertical surface and a retainer washer carried by said stud, said intermediate section having a plurality of axially extending, circumferentially-spaced radially projecting ridges formed on the outer surface thereof adapted to abut said bearing surface, said insulator being split along a vertical plane midway between its ends, and means engageable with said stud for maintaining the arm clamped between said flanges.

2. In an automotive vehicle, the combination including a propeller shaft and a chassis frame member; a supporting member in which said shaft is rotatably journaled, said supporting member having a pair of arms extending toward said frame member, the free end of each of said arms being provided with an aperture to form a cylindrical bearing surface; flexible universal joints connecting said arms to said frame member, each of said joints including a stud extending normally from one wall of said frame member and being coaxial with and extending through a respective bearing surface, a sleeve carried by said stud having its outer surface radially spaced from said bearing surface, a pair of bushings of resilient material interposed between said sleeve and bearing surface, the outer surfaces of said bushings having a plurality of axially extending, circumferentially spaced, radially projecting ridges formed thereon adapted to abut said bearing surface, said bushings having abutting ends and the opposite ends of each of said bushings being provided with an integrally-formed flange, the flange of one of said bushings abutting said frame member and one side of a respective arm and the flange of said other bushing abutting the opposite side of said arm, the axial thickness of each of said flanges being approximately one half the length of its respective bushing, and a washer carried by said stud, and means engageable with said stud for maintaining the arm clamped between said flanges.

References Cited in the file of this patent

UNITED STATES PATENTS

| Number | Name | Date |
|---|---|---|
| 2,308,965 | Riesing | Jan. 19, 1943 |
| 2,465,785 | Berno | Mar. 29, 1949 |